(12) United States Patent
Boutillon (10) Patent No.: US 10,833,758 B2
(45) Date of Patent: Nov. 10, 2020

(54) DISTRIBUTED-DEMODULATION SATELLITE COMMUNICATION SYSTEM

(71) Applicant: THALES, Courbevoie (FR)

(72) Inventor: Jean-François Boutillon, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/775,117

(22) Filed: Jan. 28, 2020

(65) Prior Publication Data
US 2020/0252123 A1    Aug. 6, 2020

(30) Foreign Application Priority Data
Jan. 31, 2019    (FR) .................................... 19 00909

(51) Int. Cl.
*H04B 7/185* (2006.01)
*H04L 27/14* (2006.01)

(52) U.S. Cl.
CPC ....... *H04B 7/18513* (2013.01); *H04B 7/1851* (2013.01); *H04B 7/18508* (2013.01); *H04B 7/18515* (2013.01); *H04B 7/18521* (2013.01); *H04B 7/18526* (2013.01); *H04B 7/18528* (2013.01); *H04B 7/18571* (2013.01); *H04B 7/18576* (2013.01); *H04B 7/18578* (2013.01); *H04L 27/14* (2013.01)

(58) Field of Classification Search
CPC .............. H04B 7/1851; H04B 7/18508; H04B 7/18513; H04B 7/18515; H04B 7/18521; H04B 7/18526; H04B 7/18528; H04B 7/18571; H04B 7/18576; H04B 7/18578
See application file for complete search history.

(56) References Cited

U.S. PATENT DOCUMENTS

| | | | | | |
|---|---|---|---|---|---|
| 5,634,190 A | * | 5/1997 | Wiedeman | ............. | H04B 7/195 455/13.1 |
| 5,740,214 A | * | 4/1998 | Rebec | ................ | H04B 7/18517 375/377 |
| 6,064,645 A | * | 5/2000 | Develet, Jr. | ............ | H04B 7/208 370/203 |

(Continued)

FOREIGN PATENT DOCUMENTS

KR    2001-0010651 A    2/2001

OTHER PUBLICATIONS

Nishiyama, et al.,"Load Balancing and QoS Provisioning Based on Congestion Prediction for GEO/LEO Hybrid Satellite Networks", Proceedings of the IEEE, vol. 99, Issue 11, pp. 1998-2007, Nov. 1, 2011.

(Continued)

*Primary Examiner* — Dominic E Rego
(74) *Attorney, Agent, or Firm* — BakerHostetler (57) ABSTRACT

A telecommunications satellite payload includes a signal receiver (ANT) for receiving signals transmitted on an uplink, an analogue-to-digital converter (ADC) for converting the received signals into digital samples, a modem (MOD), an inter-satellite communication device (ISL) and a traffic management unit (GT) configured, on the basis of resource planning information (PL), so as to transmit the digital samples either to the modem (MOD) in order to be demodulated or to the inter-satellite communication device (ISL) in order to be transmitted to a recipient satellite responsible for demodulating the digital samples.

8 Claims, 4 Drawing Sheets

(56) References Cited

U.S. PATENT DOCUMENTS

| | | | | |
|---|---|---|---|---|
| 8,111,646 | B1* | 2/2012 | Chang | H04B 7/18523 |
| | | | | 370/316 |
| 9,337,918 | B2* | 5/2016 | Bell | H04B 7/18582 |
| 2005/0101247 | A1* | 5/2005 | Nishinaga | H04B 7/18515 |
| | | | | 455/11.1 |
| 2012/0131618 | A1* | 5/2012 | Lester | H04H 20/74 |
| | | | | 725/70 |
| 2012/0295538 | A1* | 11/2012 | Arcidiacono | H04B 7/18513 |
| | | | | 455/13.4 |
| 2012/0319885 | A1* | 12/2012 | Chang | H03F 1/3258 |
| | | | | 341/155 |
| 2015/0249462 | A1* | 9/2015 | Chang | H03F 3/211 |
| | | | | 398/43 |
| 2015/0381266 | A1* | 12/2015 | Fujimura | H04B 7/2041 |
| | | | | 370/318 |
| 2016/0254855 | A1* | 9/2016 | Tong | H04B 7/18513 |
| | | | | 370/316 |
| 2017/0214500 | A1* | 7/2017 | Hreha | H04L 5/0023 |
| 2018/0062732 | A1* | 3/2018 | Beckner | H04L 1/0045 |
| 2020/0028575 | A1* | 1/2020 | Buer | H04B 7/2041 |
| 2020/0158530 | A1* | 5/2020 | Xu | G08G 1/0116 |

OTHER PUBLICATIONS

Medina, et al., "QoS Routing for LEO Satellite Networks", Pervasive Computing and the Networked World, pp. 482-494, Nov. 28, 2012.

Taleb, et al., "Explicit Load Balancing Technique for NGEO Satellite IP Networks With On-Board Processing Capabilities", IEEE/ACM Transactions on Networking, vol. 17, No. 1, pp. 281-293, Feb. 1, 2009.

* cited by examiner

DISTRIBUTED-DEMODULATION SATELLITE COMMUNICATION SYSTEM

CROSS-REFERENCE TO RELATED APPLICATIONS

This application claims priority to foreign French patent application No. FR 1900909, filed on Jan. 31, 2019, the disclosure of which is incorporated by reference in its entirety.

FIELD OF THE INVENTION

The invention relates to the field of satellite telecommunication systems. It pertains more precisely to a telecommunication system having a distributed demodulation capacity between various satellites of a constellation. The aim of the invention is to reduce the mass, the size, the cost and the consumption of a processor on board a satellite that is responsible for demodulating received signals.

BACKGROUND

In a satellite telecommunication system based on one or more satellite constellations, each satellite is responsible for serving a terrestrial coverage area. Depending on the nature of the area (notably land or sea), the number of users to be served in the area may vary greatly. Thus, each satellite of a constellation has to serve a varying number of users, in particular due to the movement of the satellites around the Earth.

Each satellite comprises a regenerative payload whose role is notably to demodulate and to modulate signals from and to users who are located in the coverage area of the satellite. A processor on board the satellite (on-board processor) is responsible for this operation. The size of the processor depends notably on the number of frequency carriers and on the bandwidth of the signal to be demodulated in one and the same unit of time. At present, these processors are sized so as to be able to serve at least 95%, or even 100% of the maximum number of possible users in a coverage area, that is to say at least 95%, or even 100%, of the worst-case scenario.

Such a size has the drawback that each satellite is equipped with a processor that may be underused in periods in which the coverage area comprises a lower number of users. Moreover, the coverage area of a satellite moves over time and may cover areas with a low density of users, typically oceans or desert areas. The processors are therefore oversized, this resulting in a higher cost, bulk (mass, size) and consumption.

There is therefore a need to reduce the size of the processors on board satellites while at the same time guaranteeing the same level of service provided to users.

One existing solution for reducing the consumption of processors on board satellites consists in implementing a low-consumption mode in the case of underloading of the processor caused by a low number of simultaneous users. However, this type of solution makes it possible to reduce the consumption of the processor only within certain limits, and is not equivalent to optimum sizing of the processor when it is designed. Therefore, the processor consumes more power than it should, and these power losses are detrimental to the satellite. In addition, this reduction in consumption is not accompanied by a reduction in size or mass of the processor and therefore does not solve this problem.

SUMMARY OF THE INVENTION

The present invention proposes a solution for reducing the size of processors on board satellites by implementing distributed demodulation of the signals transmitted by users to a satellite, by all of the satellites of the constellation. The size of the processors is thereby able to be reduced, as an overloaded satellite is able to transmit the received signals that it is not capable of demodulating to one or more neighbouring satellites that are underloaded at the same time. The invention thus takes into account the variability in the number of users per coverage area in order to adapt the processing capacities of all of the processors on board the satellites of the constellation to the overall density of users present in the various coverage areas covered by the satellites. The invention uses inter-satellite communication links for this purpose.

One subject of the invention is thus a telecommunications satellite payload comprising a signal receiver for receiving signals transmitted on an uplink, an analogue-to-digital converter for converting the received signals into digital samples, a modem, an inter-satellite communication device and a traffic management unit configured, on the basis of resource planning information, so as to transmit the digital samples either to the modem in order to be demodulated or to the inter-satellite communication device in order to be transmitted to a recipient satellite responsible for demodulating the digital samples.

Each signal received by the signal receiver is associated with a beam or with a carrier, and the resource planning information contains an association between the beam or the carrier, on the one hand, and the satellite responsible for demodulating the received signal, on the other hand.

The traffic management unit is configured so as to encapsulate the digital samples in a frame containing at least one identifier indicating that the digital samples are not demodulated and a destination address of the satellite responsible for demodulating the digital samples.

According to one particular variant, the payload according to the invention comprises a router for routing the frames generated by the traffic management unit or demodulated by the modem to their destination.

According to one particular aspect of the invention, the router is configured, when it receives a frame from the inter-satellite communication device, so as to transmit it to the modem in order to be demodulated if the frame contains digital samples to be demodulated whose destination address is that of the satellite.

According to one particular aspect of the invention, the router is configured, when it receives a frame from the inter-satellite communication device, so as to transmit it to the modem in order to be modulated if the frame contains demodulated samples whose destination address is that of the satellite.

According to one particular aspect of the invention, the inter-satellite communication device is able to establish an optical communication link between at least two satellites.

Another subject of the invention is a telecommunications system comprising a plurality of satellites each comprising a payload according to the invention, the system also comprising a resource planning device configured so as to determine, at various times, resource planning information and to transmit it to the satellites of the system.

According to one particular aspect of the invention, the resource planning device EPR is configured so as to execute, for each given time interval, the steps of:

For each beam or carrier associated with a coverage area, assigning the demodulation of the beam or of the carrier to the satellite receiving the beam or the carrier if its maximum demodulation capacity has not been reached, and otherwise assigning the demodulation of the beam or of the carrier to another satellite of the system whose maximum demodulation capacity has not been reached, Transmitting, to each satellite of the system, resource planning information containing an association between the beam or the carrier to be demodulated for the coverage area of the satellite, on the one hand, and the satellite responsible for demodulating the received signal, on the other hand.

Another subject of the invention is a method for planning resources in a telecommunications system comprising a plurality of satellites, the method comprising the steps of, for each given time interval:

For each beam or carrier associated with a coverage area, assigning the demodulation of the beam or of the carrier to the satellite receiving the beam or the carrier if its maximum demodulation capacity has not been reached, and otherwise assigning the demodulation of the beam or of the carrier to another satellite of the system whose maximum demodulation capacity has not been reached, Transmitting, to each satellite of the system, resource planning information containing an association between the beam or the carrier to be demodulated for the coverage area of the satellite, on the one hand, and the satellite responsible for demodulating the received signal, on the other hand, In order to demodulate a beam or a carrier, encapsulating the digital samples to be demodulated in a frame containing at least one identifier indicating that the digital samples are not demodulated and a destination address of the satellite responsible for demodulating the digital samples.

DETAILED DESCRIPTION

Figure 1:
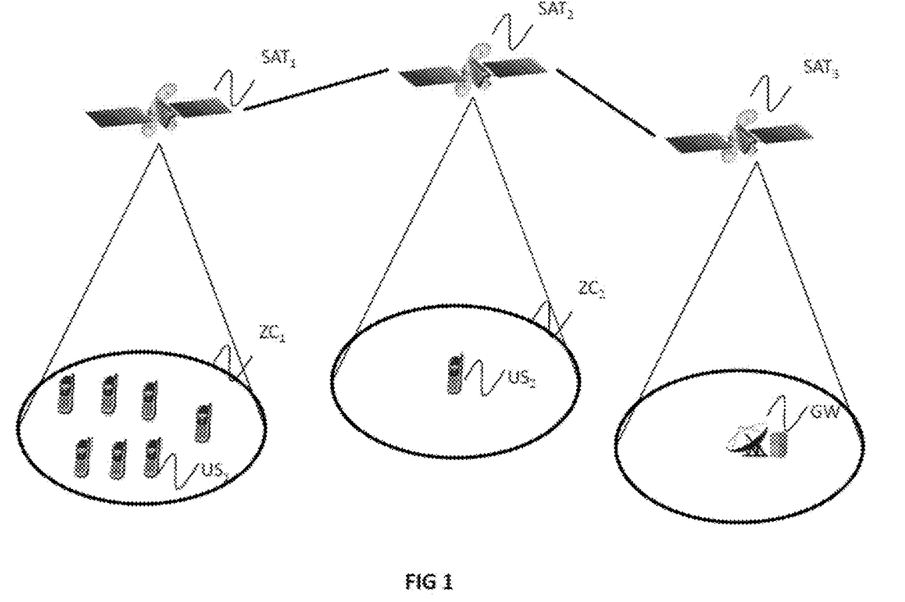
FIG. 1 shows a regenerative satellite telecommunications system with inter-satellite links according to the prior art.

FIG. 1 shows a satellite telecommunications system according to the prior art, which comprises a constellation of satellites having regenerative payloads that are linked to one another via inter-satellite links. The service provided by the satellite telecommunications system consists of a communication link between a user of a terminal $US_1, US_2$ and an access gateway GW (gateway) to a terrestrial network, for example the Internet. The expression "user" in practice denotes the terminal that the user uses to communicate via the system. This terminal is generally equipped with one or more antennas that are intended to receive the signals from the satellite with which it is in contact or to send signals thereto, and a modem intended to demodulate the data received from the satellite in order to transmit them to the user, and to modulate the data received from the user in order to send them to the satellite via the antenna. The (bidirectional) communication link between a user and an access gateway is established via links between the user and a satellite, between a plurality of satellites and between a satellite and the access gateway. In the example of FIG. 1, the communication link between the user $US_1$ and the access gateway GW passes through the satellites $SAT_1, SAT_2$ and $SAT_3$. The communication link between the user $US_2$ and the access gateway GW passes through the satellites $SAT_2$ and $SAT_3$.

Each satellite $SAT_1, SAT_2$ covers a terrestrial coverage area $ZC_1, ZC_2$ that has a variable density of users at all times. In the example of FIG. 1, the coverage area $ZC_1$ of the satellite $SAT_1$ contains a large number of users, whereas the coverage area $ZC_2$ of the satellite $SAT_2$ contains a small number of users. As indicated in the preamble, the processor responsible for demodulating the signals transmitted by the users is sized, in each satellite, based on a worst-case scenario of the number of users per coverage area. For example, it is sized so as to simultaneously process the signals coming from 95% to 100% of the maximum number of users per coverage area. By sizing the processors on board the satellites in this way, it is seen that the processor is sometimes underused as the coverage area contains only a small number of users. This is the case of the processor on board the satellite $SAT_2$ in FIG. 1.

The invention proposes a solution for reducing the size of the on-board processors and the power that they consume by sizing them so as to be capable of processing not 95% to 100% of the maximum number of users but an average load of for example 50% of the maximum number of users, or else equal to the total number of users to be processed on Earth divided by the number of satellites of the constellation. The amount of power that is consumed is thereby reduced significantly.

In order to be able to ensure the same quality of service with smaller processors, the invention consists in distributing the processing of the demodulation of the signals received by the satellites over a plurality of satellites of the constellation, on the basis of the actual load of each processor corresponding to the instantaneous density of users in each coverage area.

Figure 2:
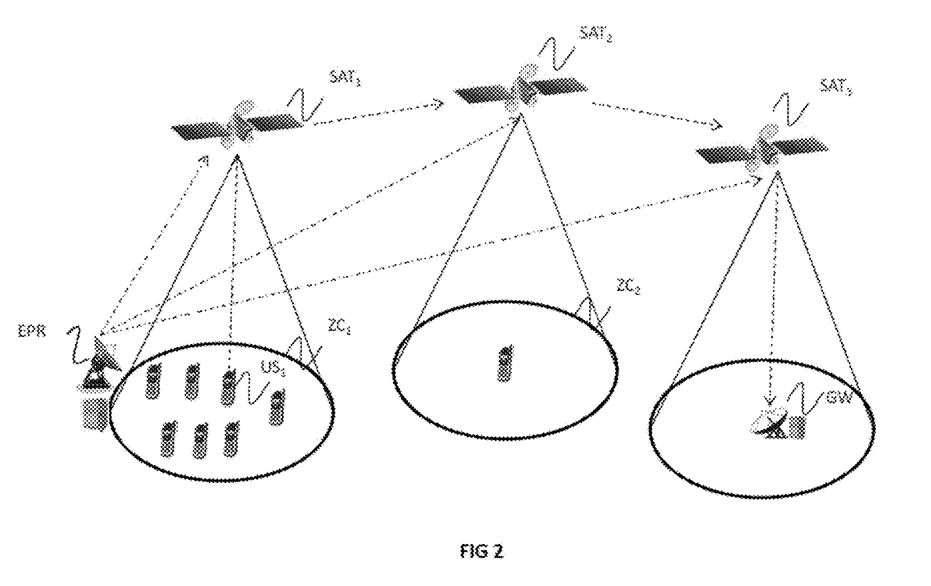
FIG. 2 illustrates the operation of a satellite telecommunications system according to the invention for a transmission from a user to a gateway station.

FIG. 2 illustrates one exemplary implementation of the invention for processing a link between a user $US_1$ and an access gateway GW.

The radiofrequency signals transmitted on the link between a user on the ground and a satellite are grouped together into beams, each beam corresponding to a spot associated with an antenna element of the multi-spot antenna device of the satellite. A coverage area groups together all of the spots illuminated by all of the beams generated by an antenna or a multi-spot antenna array embedded in the satellite.

The system according to the invention contains a resource planning device EPR that is responsible, at all times or within a predefined time interval, for defining the demodulation load of each satellite of the constellation on the basis of the actual density of users in each spot of each coverage area. The resource planning device EPR at all times has an indication regarding the number of users in each spot, by virtue of reports sent by the satellites.

On the basis of this indication, the resource planning device EPR transmits, to each satellite of the constellation, via a signalling link, resource planning information that comprises, for each time interval and for each beam or spot, the address of the satellite of the constellation that is responsible for demodulating the signals received via this beam for this time interval.

The resource planning takes into account the instantaneous density of users in each coverage area and the instantaneous density of traffic to be processed. Thus, in the example of FIG. 2, the coverage area $ZC_1$ has a high density of users, whereas the coverage area $ZC_2$ has a low density of users. Therefore, the processor on board the satellite $SAT_1$ is not able to process all of the signals transmitted simultaneously by all of the users in its coverage area. The resource planning information will then tell it to transmit the signals received via certain beams to other satellites, for example the satellite $SAT_2$ whose processor is not 100% loaded.

Thus, in the example of FIG. 2, the signal transmitted by the user $US_1$ is received by the satellite $SAT_1$, which digitizes the signal and then encapsulates the digitized samples in a frame, for example an Ethernet frame, by adding the nature of the samples of the frame (samples to be demodulated) and the destination address of the satellite $SAT_2$ responsible for demodulating these samples into the header of the frame. The encapsulated signal is transmitted on an inter-satellite link, which is for example a free-space optical link or laser link. Upon receiving the encapsulated signal, the processor of the satellite $SAT_2$ verifies that the frames contain samples to be demodulated and that it is responsible for the demodulation. As it has been told by the resource planning device EPR, the processor of the satellite $SAT_2$ demodulates the samples and then transmits the demodulated signal to its destination, that is to say the gateway station GW, via for example one or more other satellite(s) $SAT_3$. The resource planning device EPR is assured that the processor of the satellite $SAT_2$ is not 100% loaded, and that it has the resources necessary to demodulate the samples received from the satellite $SAT_1$.

In summary, by virtue of the resource plan established by the resource planning device EPR, each satellite of the constellation at all times has the information about the received beams that it is capable of demodulating directly and about the received beams that it has to transmit to another less loaded satellite that will perform the demodulation.

Although the satellites $SAT_1$ and $SAT_2$ are shown next to one another in FIG. 2, they may be remote and linked via a plurality of hops that involve other satellites.

Figure 3:
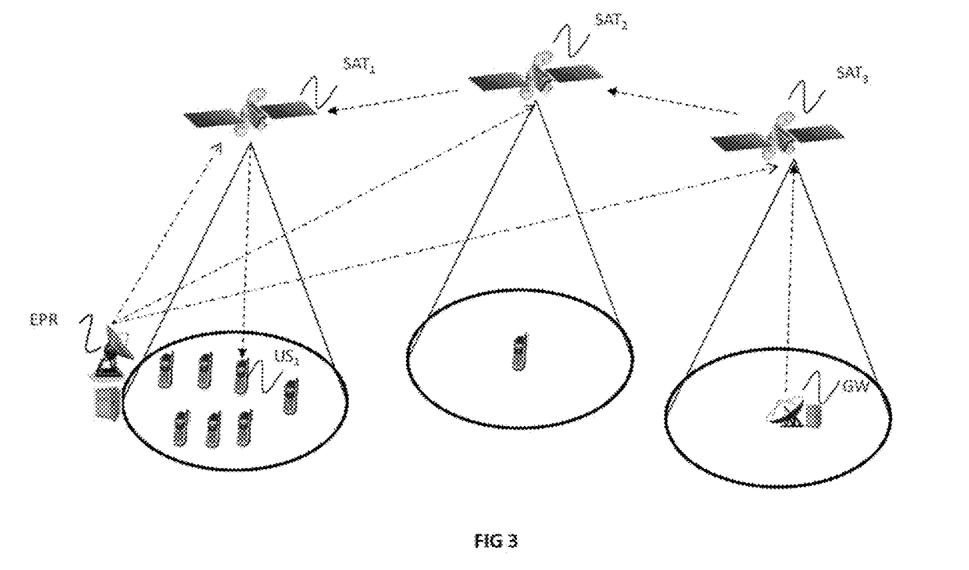
FIG. 3 illustrates the operation of a satellite telecommunications system according to the invention for a transmission from a gateway station to a user.

FIG. 3 illustrates one exemplary implementation of the invention for processing a link between an access gateway GW and a user $US_1$. For this link, the principle of the invention is identical to the example described above for FIG. 2, with the difference that the signals received by a satellite $SAT_3$ from the access gateway GW are transmitted on frequency carriers that differ depending on their destination, that is to say the recipient user. In other words, transmission resources are shared between users by frequency carriers and not by beams, as in the case illustrated in FIG. 2.

The resource planning device EPR transmits resource planning information to each satellite, this information indicating which satellite of the constellation is responsible for demodulating the signals received on each carrier for each time interval. In other words, when the satellite $SAT_3$ receives a signal from the gateway station GW, it knows, on the basis of the carrier of the signal, whether it has to demodulate it (because it has the capacity to do so) or whether it has to transmit the digitized samples of this signal to another satellite responsible for the demodulation, according to the same principle as described for FIG. 2.

Figure 4:
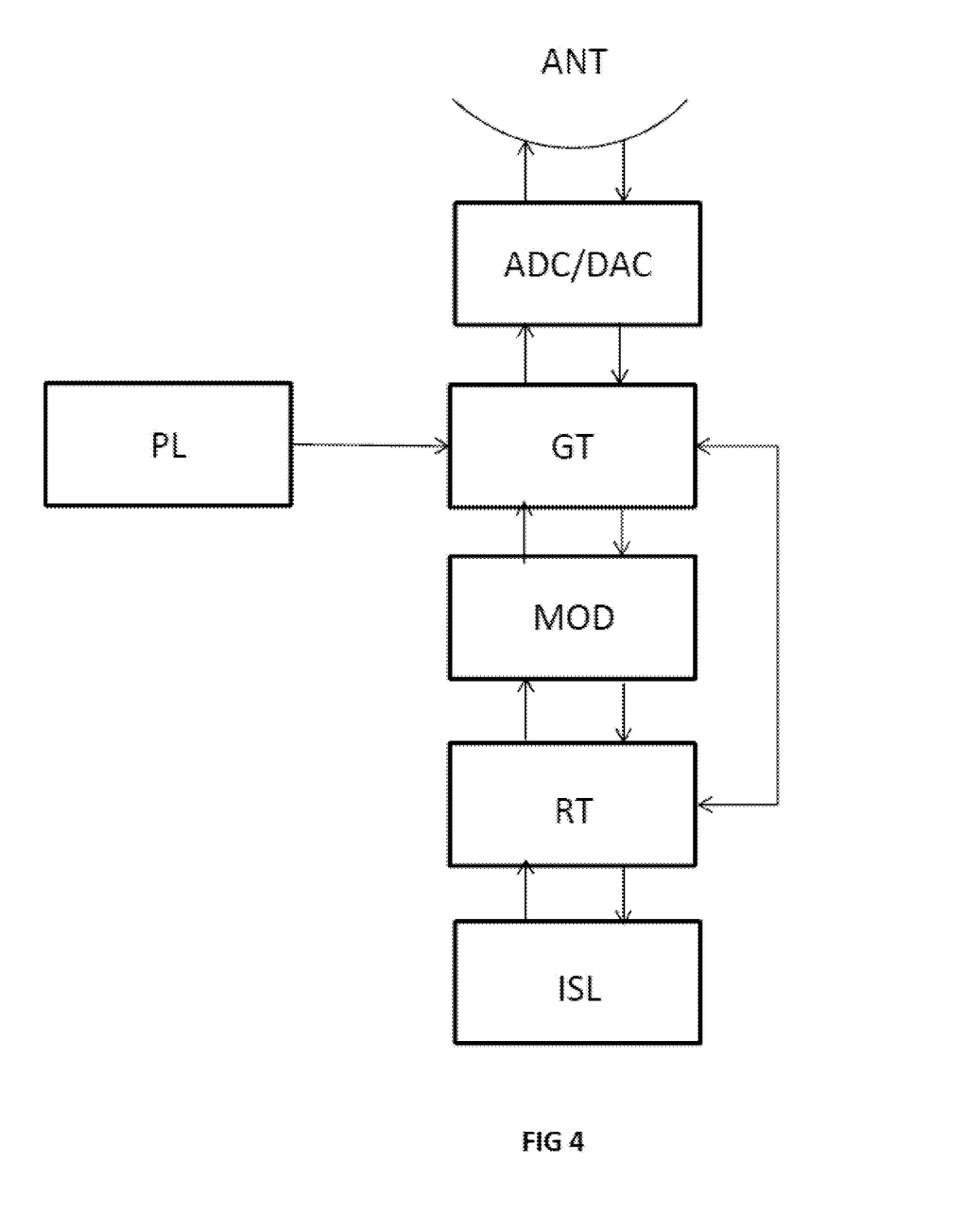
FIG. 4 shows an example of a payload of a satellite according to the invention.

FIG. 4 outlines an example of a payload of a satellite according to one embodiment of the invention. The payload comprises one or more antennas or antenna arrays ANT able to transmit and receive signals in the form of a plurality of beams illuminating a plurality of spots that together form a coverage area. A plurality of users operating via a terminal are located in each spot. The antenna device ANT also comprises another antenna or antenna array for establishing a link with a network gateway GW on the ground. In this case, the link is not established in the form of beams, but comprises a plurality of frequency carriers, each carrier being associated with a group of users. Generally speaking, the antenna device ANT forms part of a signal transceiver.

When a beam or a carrier is received by the antenna device ANT, the associated analogue signals are digitized via an analogue-to-digital converter ADC. The payload also comprises a memory or a register PL that comprises resource planning information that is updated at each time interval, for example every second. This information is transmitted to the satellite by the resource planning device EPR via a signalling link. The resource planning information contains an association between the beam or the carrier received by the satellite and the address of the satellite responsible for demodulating this beam or this carrier. This resource planning information takes into account the instantaneous load state of each satellite. In other words, it takes into account the density of users present in each spot or the throughput of the carrier coming from the gateway station.

The payload also comprises a traffic management unit GT that performs the following operations. If the resource planning information indicates that the satellite responsible for demodulating the signal is the satellite that receives the signal, then the digitized signal is transmitted to a modem MOD that demodulates the signal in order to provide packets of payload data, for example packets in accordance with the Ethernet format or any other network access format. The demodulated packets are then transmitted to a router RT, which transmits the packets to their destination, that is to say to the network gateway GW. The path that links the satellite to the network gateway GW may pass through one or more other satellites. It is also possible for the user and the network gateway GW to be linked to the same satellite. The satellites communicate with one another via an inter-satellite link. The inter-satellite link is formed by way of a free-space optical link or laser link. To this end, each payload contains an inter-satellite communication device ISL that may be formed by a laser or by an optical device.

If the resource planning information indicates that the satellite responsible for demodulating the signal is not the satellite that receives the signal but another satellite of the constellation, then the digitized signal is encapsulated in frames of the same kind as those transmitted by the modem MOD to the router RT, for example Ethernet frames. In the header of each frame, the traffic management unit GT inserts the destination address of the satellite responsible for demodulating the digitized signal and information about the nature of the signal contained in the frames, that is to say an identifier that indicates that the frames contain a digitized signal to be demodulated.

The frames generated by the traffic management unit GT are then transmitted to the router RT that is responsible for transmitting the frames to the destination address.

When the recipient satellite receives the frames, the router of the satellite identifies the nature of the frames and therefore transmits them to the modem MOD that is responsible for demodulating the digitized samples. The demodulated packets of payload data are then transmitted to the router RT, which transmits them to their destination, that is to say the network gateway GW.

The payload according to the invention may be implemented by software means or hardware means or by a combination of software and hardware techniques.

In particular, the traffic management unit GT, the modem MOD and the router RT may be implemented by way of a processor, which may be a generic processor, a specific processor, an application-specific integrated circuit (also known under the name ASIC) or a field-programmable gate array (also known under the name FPGA) or any combination of these devices. The invention may use one or more dedicated electronic circuits or a general-purpose circuit. The technique of the invention may be carried out on a reprogrammable calculation machine (a processor or a microcontroller for example) executing a program comprising a sequence of instructions, or on a dedicated calculation machine (for example a set of logic gates such as an FPGA or an ASIC, or any other hardware module) or on any combination of these devices.

The resource planning information is transmitted to the satellites of the constellation by a resource planning device EPR via a signalling link.

Figure 5:
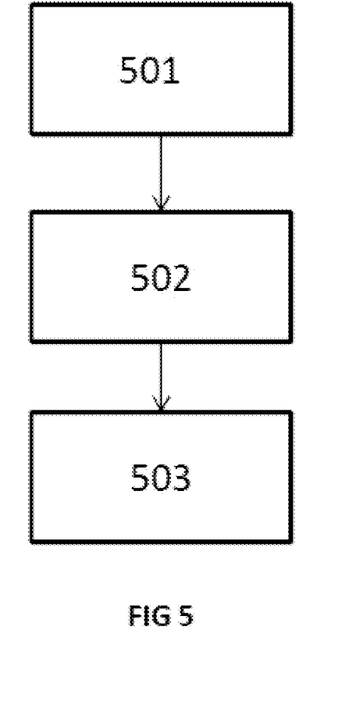
FIG. 5 shows a flowchart describing the steps for implementing a method for planning resources in a telecommunications system according to the invention.

In the case of the uplink between the users and the satellite, this information is determined on the basis of the density of users per spot/beam. One possible method for determining the resource planning information at a given time is illustrated by the flowchart of FIG. 5. It comprises a first step 501 consisting in associating, with each satellite, the processing (demodulation) of a number of users equal to the minimum between the number of users present in the coverage area of the satellite at a given time and a maximum number of users corresponding to the demodulation capacity of the payload of the satellite. For example, the processor on board the satellite is sized such that it is capable of simultaneously demodulating N signals. If the number of users present in the coverage area is less than or equal to N, then the satellite is responsible for demodulating all of the received signals. By contrast, if the number of users present in the coverage area is strictly greater than N, then the satellite is responsible for demodulating only some of the beams.

At the end of the first step 501, some satellites have a load on their processor that is close to or equal to its maximum capacity, whereas other satellites have a load less than or equal to the maximum capacity, as their coverage area is less dense in terms of users.

In a second step 502, the beams that have not been assigned to the satellite that covers their coverage area are distributed to satellites whose on-board processor is not loaded to its maximum capacity. This second step 502 may be performed iteratively in several successive passes. The demodulation of a beam is preferably assigned to a satellite first and foremost on the basis of its proximity to the satellite that receives the beam, so as to minimize the delays brought about by transmitting the beam to a remote satellite responsible for demodulating it.

When each beam or carrier has been assigned to a satellite and the resource planning information is complete, it is transmitted 503 to the satellites by the resource planning device EPR.

In order to demodulate a beam or a carrier, the digital samples to be demodulated are encapsulated in a frame containing at least one identifier indicating that the digital samples are not demodulated and a destination address of the satellite responsible for demodulating the digital samples as described above.

In the case of the uplink between an access gateway GW and the satellite, the resource planning information is determined on the basis of the bandwidth (expressed in MHz) of each carrier transmitted by the gateway. This bandwidth depends inter alia on the number of users simultaneously receiving signals from the access gateway GW via the same carrier. The resource planning method operates in the same way as for the link between users and a satellite, with the difference that a beam is replaced with a carrier.

Generally speaking, a beam or a carrier is associated with a satellite other than the satellite that receives the beam or the carrier if the demodulation capacity of the processor on board the satellite is reached due to the fact that the number of beams or carriers to be demodulated simultaneously is too high, also given the throughput (depending on the number of users) of the link associated with the beam or with the carrier.

The invention notably has the advantage of allowing a reduced size of the processors on board satellites, while at the same time guaranteeing the same level of service as current systems.

The invention also makes it possible to reduce the amount of redundancy on the processors on board each satellite, since a fault with part of the processor may be compensated by the capacity of processors of neighbouring satellites. Redundancy management may thus be simplified, thereby further contributing to reducing the mass and cost of the processors.

The invention claimed is:

1. A telecommunications satellite payload comprising a signal receiver (ANT) for receiving signals transmitted on an uplink, an analogue-to-digital converter (ADC) for converting the received signals into digital samples, a modem (MOD), an inter-satellite communication device (ISL) and a traffic management unit (GT) configured, on the basis of resource planning information (PL), so as to transmit the digital samples either to the modem (MOD) in order to be demodulated or to the inter-satellite communication device (ISL) in order to be transmitted to a recipient satellite responsible for demodulating the digital samples,
  each signal received by the signal receiver (ANT) being associated with a beam or with a carrier, and the resource planning information (PL) containing an association between the beam or the carrier, on the one hand, and the satellite responsible for demodulating the received signal, on the other hand,
  the traffic management unit (GT) being configured so as to encapsulate the digital samples in a frame containing at least one identifier indicating that the digital samples are not demodulated and a destination address of the satellite responsible for demodulating the digital samples.

2. The telecommunications satellite payload according to claim 1, comprising a router (RT) for routing the frames generated by the traffic management unit (GT) or demodulated by the modem (MOD) to their destination.

3. The telecommunications satellite payload according to claim 2, wherein the router (RT) is configured, when it receives a frame from the inter-satellite communication device (ISL), so as to transmit it to the modem (MOD) in order to be demodulated if the frame contains digital samples to be demodulated whose destination address is that of the satellite.

4. The telecommunications satellite payload according to claim 2, wherein the router (RT) is configured, when it receives a frame from the inter-satellite communication device (ISL), so as to transmit it to the modem (MOD) in order to be modulated if the frame contains demodulated samples whose destination address is that of the satellite.

5. The telecommunications satellite payload according to claim 1, wherein the inter-satellite communication device (ISL) is able to establish an optical communication link between at least two satellites.

6. The telecommunications system comprising a plurality of satellites ($SAT_1, SAT_2, SAT_3$) each comprising a payload according to claim 1, the system also comprising a resource planning device (EPR) configured so as to determine, at various times, resource planning information (PL) and to transmit it to the satellites of the system.

7. The telecommunications system according to claim 6, wherein the resource planning device (EPR) is configured so as to execute, for each given time interval, the steps of:
for each beam or carrier associated with a coverage area, assigning the demodulation of the beam or of the carrier to the satellite receiving the beam or the carrier if its maximum demodulation capacity has not been reached, and otherwise assigning the demodulation of the beam or of the carrier to another satellite of the system whose maximum demodulation capacity has not been reached,
transmitting, to each satellite of the system, resource planning information containing an association between the beam or the carrier to be demodulated for the coverage area of the satellite, on the one hand, and the satellite responsible for demodulating the received signal, on the other hand.

8. A method for planning resources in a telecommunications system comprising a plurality of satellites, each satellite comprising a processor, the method comprising the steps of, for each given time interval:
for each beam or carrier associated with a coverage area, assigning the demodulation of the beam or of the carrier to the satellite receiving the beam or the carrier if the maximum demodulation capacity of the processor of the satellite has not been reached, and otherwise assigning the demodulation of the beam or of the carrier to another satellite of the system whose maximum demodulation capacity has not been reached,
transmitting, to each satellite of the system, resource planning information containing an association between the beam or the carrier to be demodulated for the coverage area of the satellite, on the one hand, and the satellite responsible for demodulating the received signal, on the other hand, in order to demodulate a beam or a carrier, encapsulating the digital samples to be demodulated in a frame containing at least one identifier indicating that the digital samples are not demodulated and a destination address of the satellite responsible for demodulating the digital samples.

* * * * *